US006772723B2

(12) United States Patent
Aoki et al.

(10) Patent No.: US 6,772,723 B2
(45) Date of Patent: Aug. 10, 2004

(54) AUTOMATIC STOP AND START CONTROL SYSTEM FOR INTERNAL COMBUSTION ENGINE

(75) Inventors: Shigeru Aoki, Wako (JP); Shigetaka Kuroda, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 173 days.

(21) Appl. No.: 10/218,659

(22) Filed: Aug. 15, 2002

(65) Prior Publication Data

US 2003/0041831 A1 Mar. 6, 2003

(30) Foreign Application Priority Data

Aug. 30, 2001 (JP) ..................................... 2001-260695

(51) Int. Cl.⁷ ............................................. F02N 17/00
(52) U.S. Cl. .................................................. 123/179.4
(58) Field of Search ............................ 123/179.4, 491, 123/179.3

(56) References Cited

U.S. PATENT DOCUMENTS

| | | | | |
|---|---|---|---|---|
| 4,364,343 A | | 12/1982 | Malik | |
| 6,098,585 A | * | 8/2000 | Brehob et al. | 123/179.4 |
| 6,202,614 B1 | * | 3/2001 | Grob et al. | 123/179.3 |
| 6,434,453 B1 | * | 8/2002 | Kuroda et al. | 701/22 |
| 6,453,864 B1 | * | 9/2002 | Downs et al. | 123/179.3 |

FOREIGN PATENT DOCUMENTS

| | | |
|---|---|---|
| DE | 195 27 503 A1 | 1/1997 |
| JP | 57-137626 | 8/1982 |
| JP | 58-160523 | 9/1983 |
| JP | 60-156979 | 8/1985 |
| JP | 2-245457 | 10/1990 |
| JP | 02245457 | 10/1990 |
| JP | 5-44618 | 2/1993 |
| JP | 05044618 | 2/1993 |
| JP | 5-312083 | 11/1993 |
| JP | 05312083 | 11/1993 |
| JP | 6-137197 | 5/1994 |
| JP | 7-103025 | 3/1995 |
| JP | 7-269-382 | 10/1995 |
| JP | 9-32707 | 2/1997 |
| JP | 09032707 | 2/1997 |
| JP | 9-68052 | 3/1997 |
| JP | 2000-204997 | 7/2000 |
| JP | 2000-257463 | 9/2000 |
| JP | 2001123865 | 5/2001 |

OTHER PUBLICATIONS

International Publication No. WO 01/48373 A1, published Jul. 5, 2001.

\* cited by examiner

*Primary Examiner*—Mahmoud Gimie
*Assistant Examiner*—Arnold Castro
(74) *Attorney, Agent, or Firm*—Arent Fox, PLLC

(57) ABSTRACT

An automatic stop and start control system for a multiple-cylinder internal combustion engine mounted on a vehicle is disclosed. The automatic stop and start control system performs a control for automatically stopping and restarting the engine according to operating conditions of the vehicle and the engine. Fuel is provided to at least one of the cylinders of the engine when an engine stop condition for stopping the engine is satisfied. Subsequently, the fuel supply to all of the cylinders of the engine is stopped. The fuel supply to at least one of the cylinders is immediately carried out at the time an engine restart condition for restarting the engine is satisfied.

24 Claims, 13 Drawing Sheets

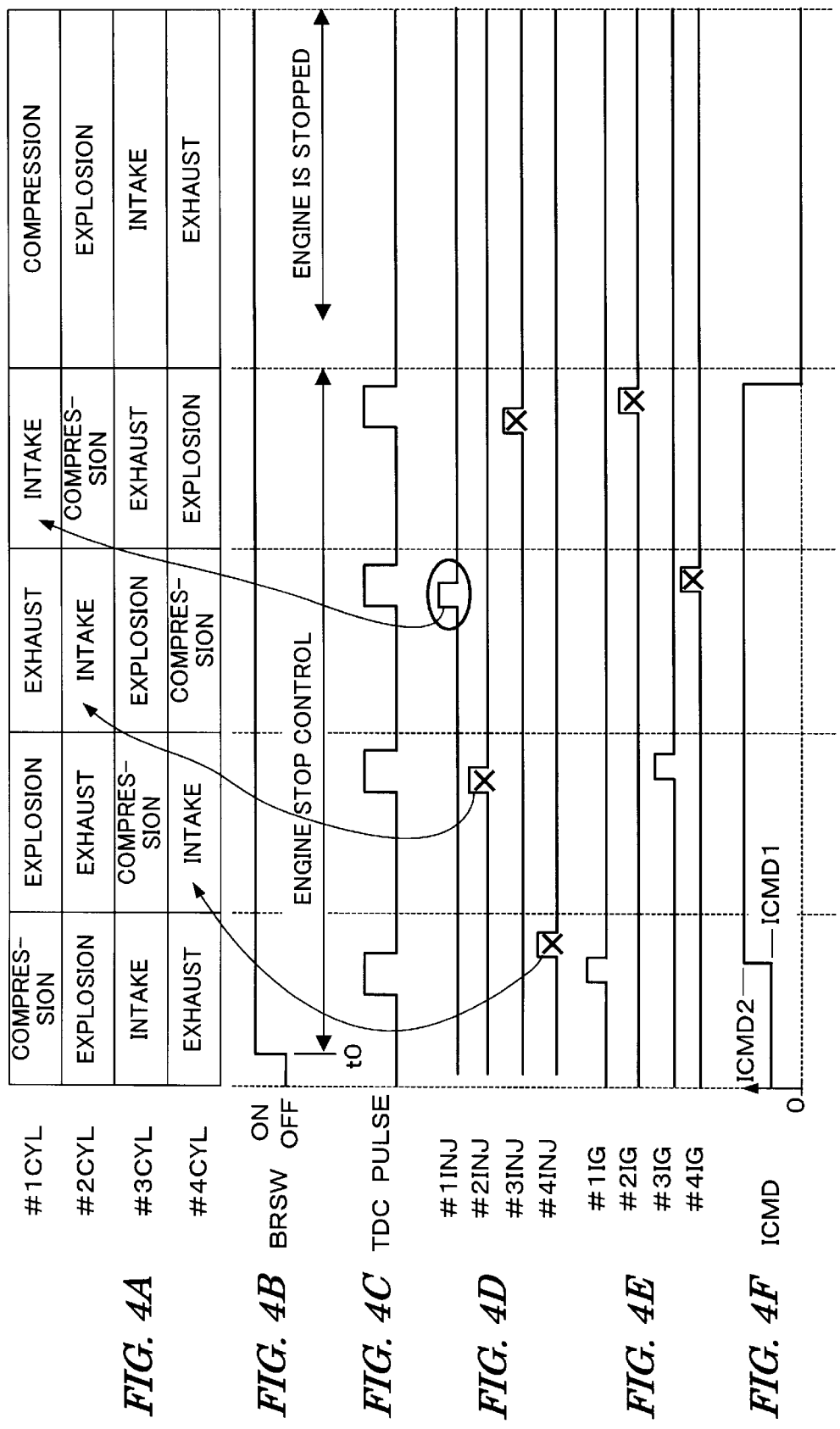

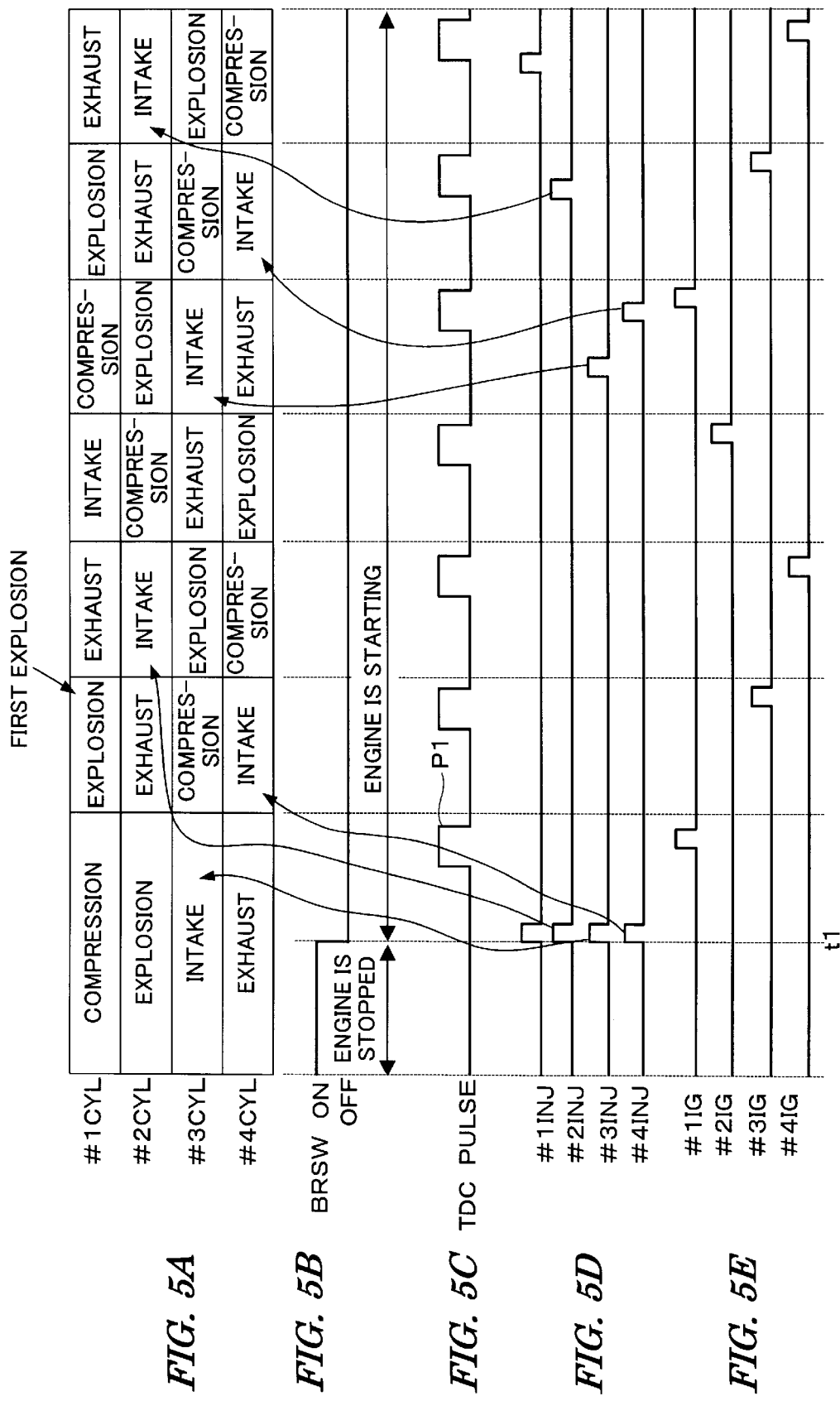

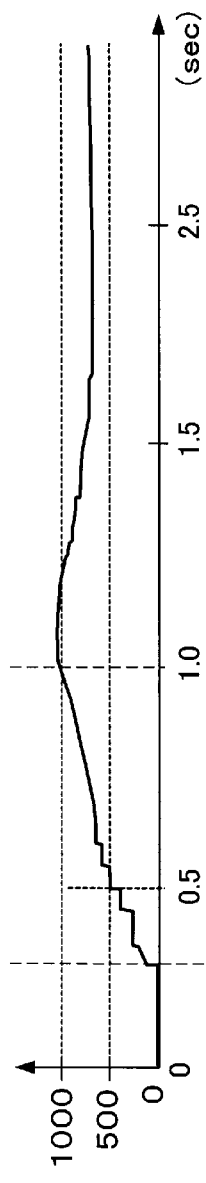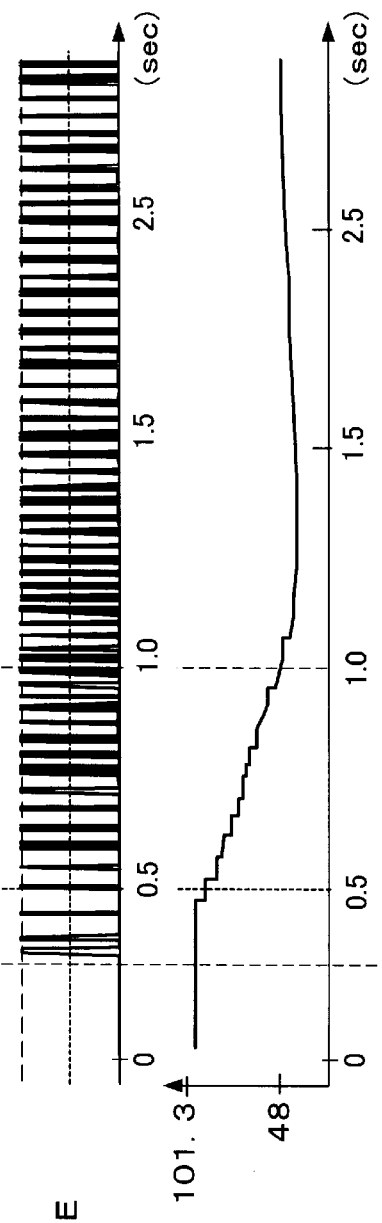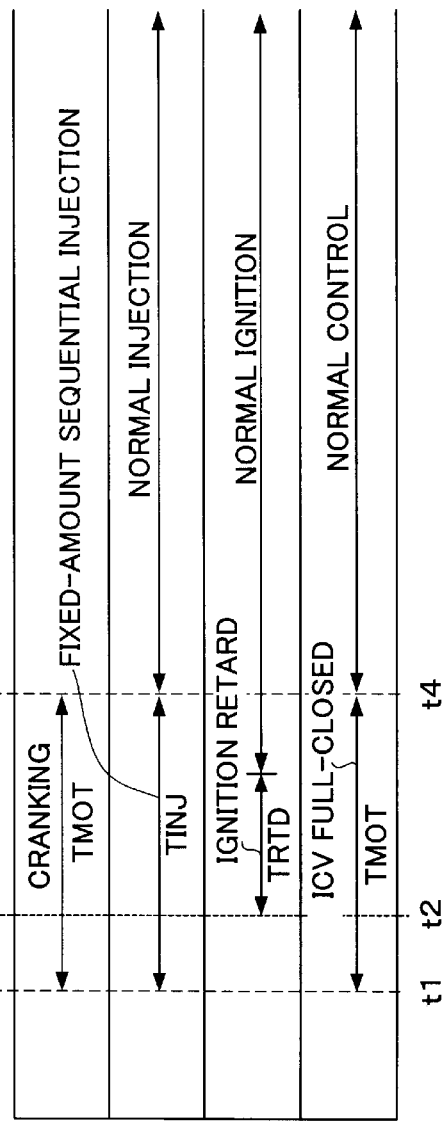
FIG. 6A NE
FIG. 6B TDC PULSE
FIG. 6C PBA (kpa)
FIG. 6D MOTOR
FIG. 6E FUEL INJECTION
FIG. 6F IGNITION
FIG. 6G IDLE CONTROL VALVE

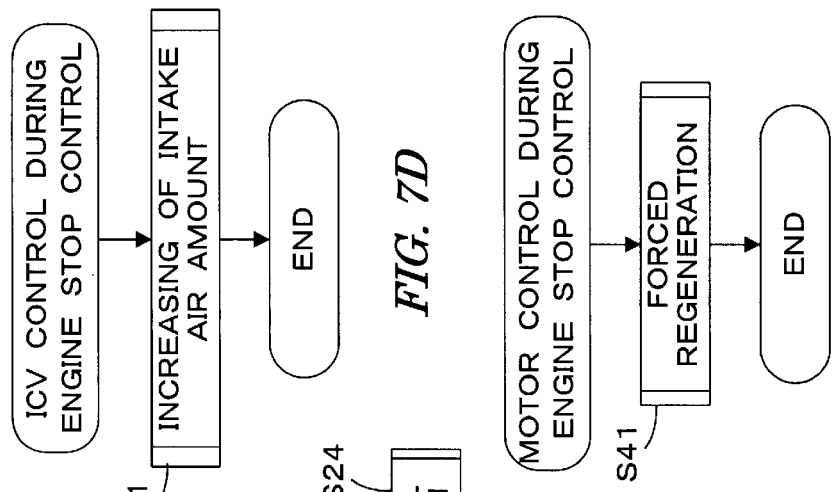
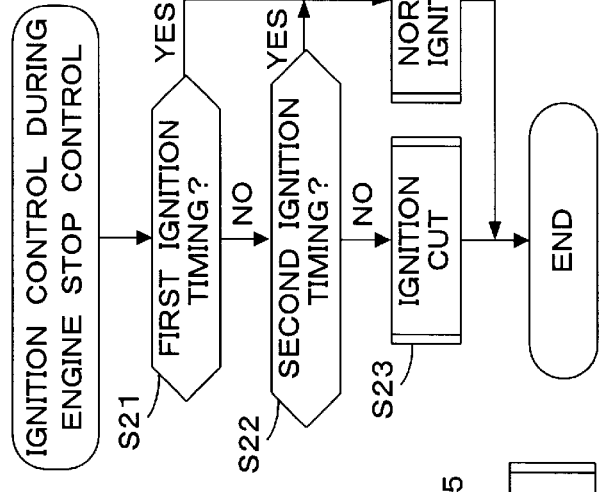
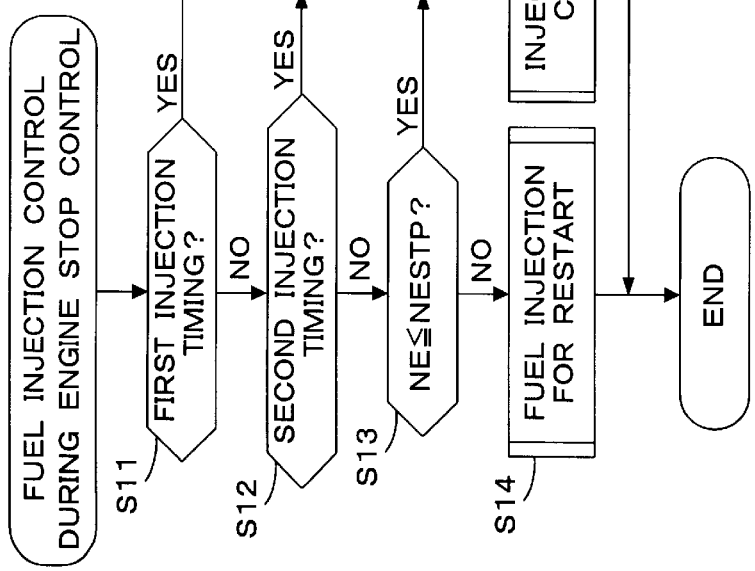

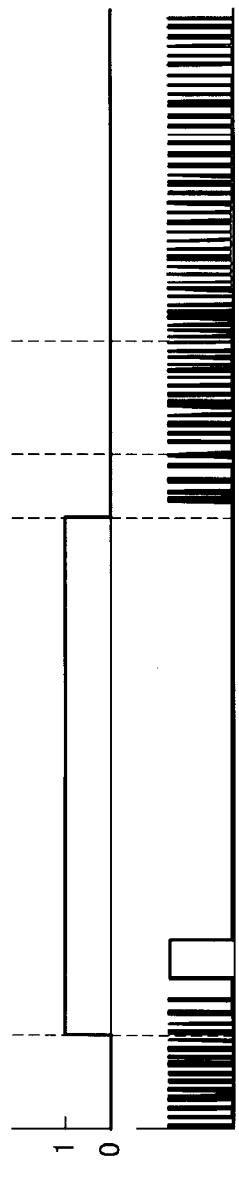
FIG. 10A  FIDLSTP
FIG. 10B  TDC PULSE
FIG. 10C  NE(rpm)
FIG. 10D  PBA(kpa)
FIG. 10E  TOUT(msec)
FIG. 10F  IGLOG(deg)
FIG. 10G  QAIR(L/min)
FIG. 10H  TRQM(kgfm)

AUTOMATIC STOP AND START CONTROL SYSTEM FOR INTERNAL COMBUSTION ENGINE

BACKGROUND OF THE INVENTION

1. Field of the Invention

The present invention relates to an automatic stop and start control system for an internal combustion engine mounted on a vehicle, which controls automatically stopping and restarting the engine, when the vehicle is stopped (an idle stop control for stopping unnecessary idling of the engine).

2. Description of the Related Art

A hybrid vehicle employs an internal combustion engine and an electric motor in combination. A conventional technique for idle stop control is known. When restarting the engine with the conventional technique, the motor is first operated to perform cranking and the engine is started at the time the engine rotational speed becomes a starting rotational speed (Japanese Patent Laid-open No. 2000-204997).

In the technique described in the above publication, the starting rotational speed is set to a value which decreases with an increase in the required drive force. Thus, when the required drive force increases, the engine is started earlier. Accordingly, when the driver of the vehicle depresses an accelerator pedal immediately after starting of the engine, the engine is restarted earlier.

But in some circumstances, it is preferable to perform engine restarting as quickly as possible irrespective of the magnitude of the required drive force to reduce the load on the motor in the hybrid vehicle. In the case of performing the idle stop control in a normal vehicle driven by only an internal combustion engine, the engine restarting must be performed as quickly as possible. For example, when the removal of a depression force applied to a brake pedal is detected, it may be determined that the driver intends to start the vehicle.

FIGS. 12A to 12E are time charts illustrating engine restart control in the prior art, which is directed to a four-cylinder internal combustion engine. FIG. 12A shows the strokes in the four cylinders (#1, #2, #3, and #4 cylinders). FIG. 12B shows an output from a brake switch for detecting the condition of a brake (the low level in FIG. 12B indicates the release of the brake). FIG. 12C shows TDC pulses generated immediately before the piston in each cylinder reaches a top dead center. FIGS. 12D and 12E respectively show drive control signals for fuel injection valves and ignition signals for four cylinders.

When the brake is released and a starter motor is operated to start cranking the engine, simultaneous injections of fuel into the four cylinders is carried out after generation of the first TDC pulse P11. At this time, the fuel is first introduced into the #4 cylinder on the intake stroke, and is next ignited by a spark generated by a spark plug for the #4 cylinder in the explosion (combustion) stroke after the compression stroke, thus generating the first explosion. When contemplating the #4 cylinder in which the first explosion is generated, this cylinder is on the exhaust stroke during stoppage of the engine, and shifts to the intake stroke after starting the cranking, via the compression stroke, to reach the explosion stroke. That is, about one and half revolutions of a crankshaft are required until the first explosion is generated after starting the cranking, and the first explosion is generated after the generation of three TDC pulses P11, P12, and P13.

FIG. 13 is a time chart showing changes in engine rotational speed and generation of TDC pulses, when actually starting the engine using the control method shown in FIGS. 12A to 12E. As understood from FIG. 13, the first explosion is generated after generating three TDC pulses after starting the cranking.

It is preferable, however, to restart the engine after the idle stop as quickly as possible. Thus, further improvement is desired.

SUMMARY OF THE INVENTION

It is accordingly an object of the present invention to provide an automatic stop and start control system for an internal combustion engine, which can restart the engine quicker than the prior art.

To attain the above object, the present invention provides an automatic stop and start control system for a multiple-cylinder internal combustion engine mounted on a vehicle. The control system controls automatically stopping and restarting the engine according to operating conditions of the vehicle and the engine. The control system includes fuel supply stop control means and fuel supply start control means. The fuel supply stop control means provides fuel to at least one of the cylinders of the engine when an engine stop condition for stopping the engine is satisfied. And then stops the fuel supply to all of the cylinders of the engine. The fuel supply start control means immediately supplies fuel to at least one of the cylinders at the time an engine restart condition for restarting the engine is satisfied.

With this configuration, the fuel supply is provided to at least one of the cylinders of the engine when the engine stop condition is satisfied, and subsequently the fuel supply to all of the cylinders of the engine is stopped. Thereafter, at the time the engine restart condition is satisfied, fuel is immediately supplied to at least one of the cylinders of the engine. By providing the fuel supply to at least one cylinder upon stoppage of the engine, the combustion (first explosion) is carried out by the first ignition pulse upon restart of the engine, and by supplying fuel at the beginning of restart of the engine, the combustion by the second ignition pulse is subsequently carried out. Accordingly, the first explosion can be generated earlier and the engine restarted quicker than in the prior art.

Preferably, when the engine stop condition is satisfied, the fuel supply stop control means first stops the fuel supply to a first predetermined number of cylinders and then provides fuel to at least one cylinder.

In the above configuration, "the first predetermined number" is set so that the at least one cylinder to which the fuel is supplied stops in the compression stroke when the engine is stopped. Specifically, the first predetermined number is set to "2" for a four-cylinder engine. This number is also set to "2" for six-cylinder or eight-cylinder engines. That is, the first predetermined number is set to a fixed value regardless of the number of cylinders.

With this configuration, the fuel supply to the first predetermined number of cylinders is first stopped when the engine stop condition is satisfied. Then the fuel supply is provided to the at least one cylinder. Accordingly, the engine can be reliably stopped, and the emission of unburnt fuel can be prevented.

Preferably, the control system further includes ignition control means for first carrying out ignitions of a second predetermined number of cylinders when the engine stop condition is satisfied, and then suspending the subsequent ignition.

In the above configuration, "the second predetermined number" is set to the number of such cylinders that the fuel is supplied before the engine stop condition is satisfied and the ignition timing comes after the engine stop condition is satisfied. Specifically, the second predetermined number is set to "2" for a four-cylinder engine, "3" for a six-cylinder engine, and "4" for an eight-cylinder engine.

With this configuration, the ignition to the second predetermined number of cylinders is carried out when the engine stop condition is satisfied, and the subsequent ignition is suspended. Accordingly, the fuel supplied before the engine stop condition is satisfied, can be reliably burned, and unnecessary ignitions after the engine stop condition is satisfied, can be prevented.

Preferably, the vehicle has a motor capable of rotationally driving an output shaft of the engine and performing a regenerative operation for converting rotational energy of the output shaft into electrical energy. The control system further includes regeneration control means for performing the regenerative operation of the motor when the engine stop condition is satisfied.

With this configuration, the regenerative operation of the motor is performed when the engine stop condition is satisfied. Accordingly, the engine can be stopped earlier by a braking effect due to the regenerative operation.

Preferably, the fuel supply start control means includes fuel amount control means for decreasing a fuel amount to be supplied to the engine as compared with the fuel amount in normal control, during a first predetermined time period from the time the engine restart condition is satisfied.

With this configuration, the fuel amount to be supplied to the engine is decreased as compared with that in normal control during the first predetermined time period from the time the engine restart condition is satisfied. Accordingly, the air-fuel ratio of an air-fuel mixture to be supplied to the at least one cylinder is controlled to be leaner than that in normal control. Thus, self-ignition can be reliably prevented, and the air-fuel mixture supplied can be reliably ignited upon restarting the engine.

Preferably, the control system further includes retard control means for retarding an ignition timing of the engine from the ignition timing in normal control, during a second predetermined time period from the time a rotational speed of the engine equals or exceeds a predetermined rotational speed when restarting the engine.

With this configuration, the ignition timing of the engine is retarded from that in normal control during the second predetermined time period from the time the rotational speed of the engine equals or exceeds the predetermined rotational speed when restarting the engine. Accordingly, the output from the engine can be suppressed to thereby prevent a rapid increase in the engine rotational speed.

Preferably, the engine is provided with intake air amount increasing means for increasing an intake air amount to the engine. The control system further includes air-fuel ratio adjusting means for increasing the intake air amount by operating the intake air amount increasing means after the engine stop condition is satisfied.

With this configuration, the intake air amount is increased by the intake air amount increasing means after the engine stop condition is satisfied. Accordingly, the air-fuel ratio of an air-fuel mixture to be supplied to the at least one cylinder is controlled to be leaner than that in normal control. Thus, self-ignition can be reliably prevented, and the air-fuel mixture supplied can be reliably ignited upon restarting the engine.

More preferably, the control system further includes inhibiting means for inhibiting an operation of the intake air amount increasing means during a third predetermined time period from the time the engine restart condition is satisfied.

With this configuration, the operation of the intake air amount increasing means is inhibited during the third predetermined time period from the time the engine restart condition is satisfied, so that the intake air amount is not increased. Accordingly, the engine output can be suppressed to thereby prevent a rapid increase in the engine rotational speed.

BRIEF DESCRIPTION OF THE DRAWINGS

FIGS. 4A to 4F are time charts for illustrating an engine stop control;

FIGS. 5A to 5E are time charts for illustrating an engine restart control;

FIGS. 6A to 6G are time charts for illustrating an operation when restarting the engine and also illustrating a control for preventing a rapid increase in the engine rotational speed;

FIGS. 7A to 7D are flowcharts of the engine stop control;

FIGS. 10A to 10H are time charts for illustrating the engine stop control and the engine restart control;

DETAILED DESCRIPTION OF THE PREFERRED EMBODIMENTS

A preferred embodiment of the present invention will now be described with reference to the drawings.

Figure 1:
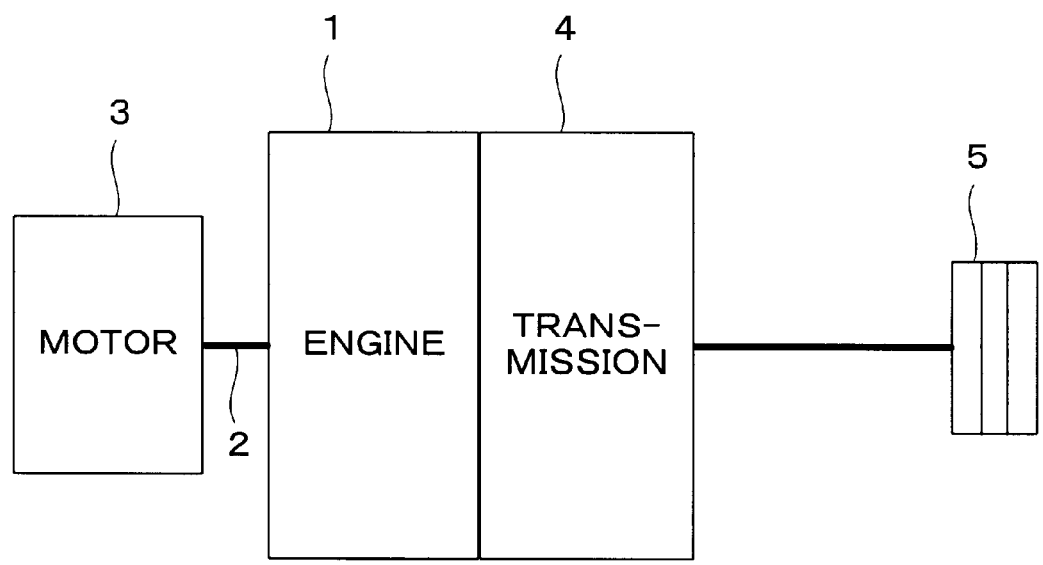
FIG. 1 is a diagram showing a schematic configuration of a drive system for a vehicle according to a preferred embodiment of the present invention.

FIG. 1 shows a schematic configuration of a drive system for a vehicle according to a preferred embodiment of the present invention. The vehicle according to the preferred embodiment is a so-called hybrid vehicle having an internal combustion engine (which will be hereinafter referred to as "engine") 1 and a motor 3. A drive shaft 2 is driven by the engine 1 to drive a drive wheel 5 through a transmission 4. The motor 3 is mounted so that it can directly rotate the drive shaft 2. The motor 3 has a regenerating function that converts kinetic energy from the rotation of drive shaft 2 into electrical energy and outputs the electrical energy. In this preferred embodiment, the motor 3 has a crank pulley (not shown) for driving auxiliaries. With this arrangement, the space for mounting the motor 3 can be reduced.

Figure 2:
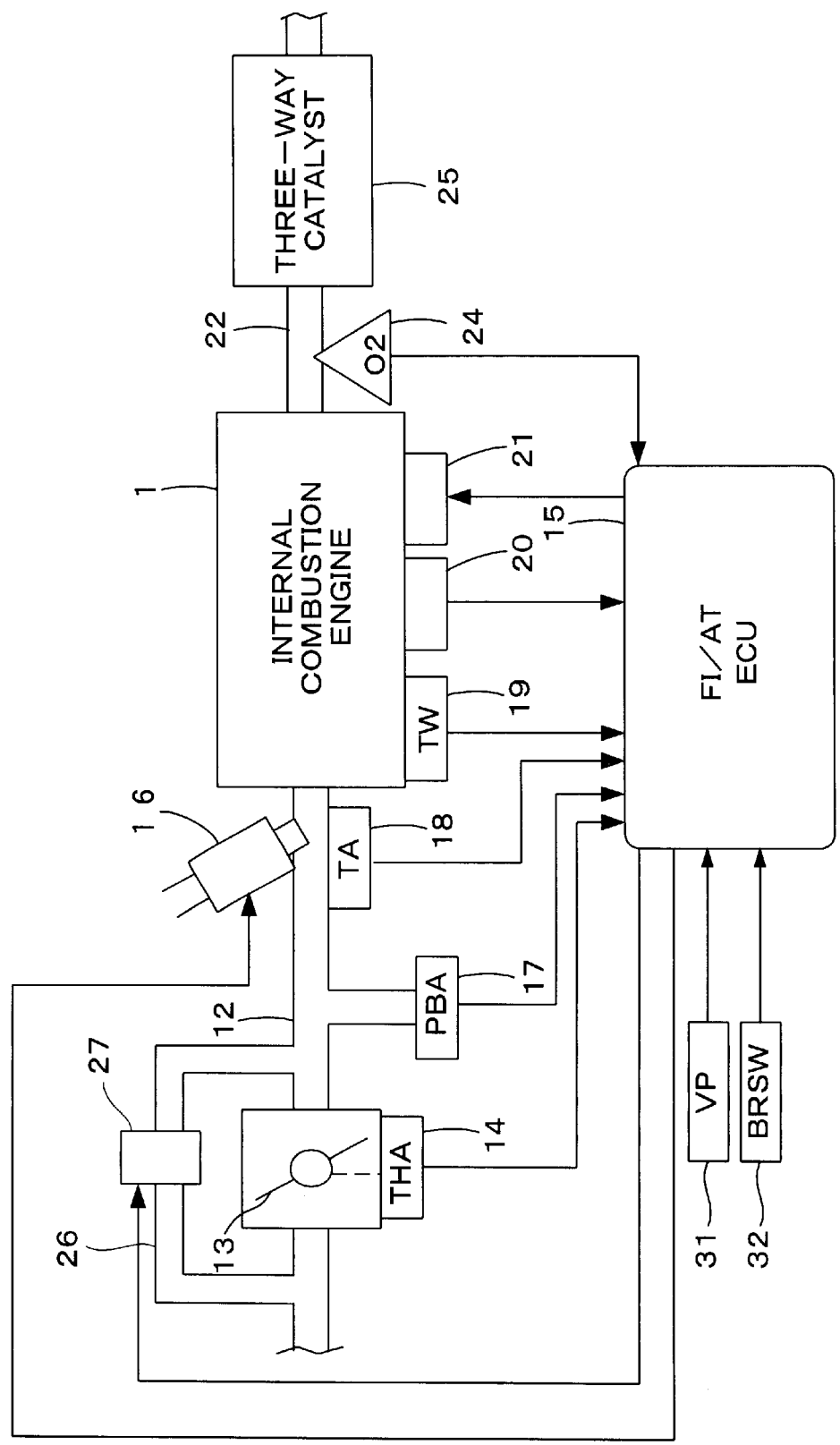
FIG. 2 is a diagram showing a schematic configuration of a control system for an internal combustion engine, including an automatic stop and start control system for the engine.

FIG. 2 shows a schematic configuration of a control system for the engine 1. This system includes an automatic stop and start control system for the engine 1. The engine 1 may be a four-cylinder engine. The engine has an intake pipe 12 provided with a throttle valve 13. A throttle valve opening (THA) sensor 14 is connected to the throttle valve 13, so as to output an electrical signal corresponding to a throttle valve opening of the throttle valve 13 and supply the electrical signal to an electronic control unit for engine control (which will be hereinafter referred to as "FI/AT-ECU") 15.

A bypass passage 26 bypassing the throttle valve 13 is connected to the intake pipe 12. The bypass passage 26 is provided with an idle control valve 27 for controlling the amount of air to be supplied through the bypass passage 26 to the engine 1. The idle control valve 27 is connected to the FI/AT-ECU 15, and its valve opening amount is controlled by the FI/AT-ECU 15.

A fuel injection valve 16 is provided for each cylinder so as to inject fuel into the intake pipe 12. Each fuel injection valve 16 is connected to a fuel pump (not shown), and electrically connected to the FI/AT-ECU 15. A valve opening period of each fuel injection valve 16 is controlled by a signal output from the FI/AT-ECU 15.

An absolute intake pressure (PBA) sensor 17 is provided immediately downstream of the throttle valve 13. An electrical signal indicative of an absolute intake pressure is supplied from the absolute intake pressure sensor 17 to the FI/AT-ECU 15. An intake air temperature (TA) sensor 18 is provided downstream of the absolute intake pressure sensor 17 to detect an intake air temperature TA. An electrical signal corresponding to the detected intake air temperature TA is output from the sensor 18 and supplied to the FI/AT-ECU 15.

An engine coolant temperature (TW) sensor 19 such as a thermistor is mounted on the body of the engine 1 to detect an engine coolant temperature (cooling water temperature) TW. A temperature signal corresponding to the detected engine coolant temperature TW is output from the sensor 19 and supplied to the FI/AT-ECU 15.

Each cylinder of the engine 1 is provided with a spark plug 21. Each spark plug 21 is connected to the FI/AT-ECU 15. An ignition timing of each spark plug 21 is controlled by the FI/AT-ECU 15.

A crank angle position sensor 20 for detecting a rotational angle of a crankshaft (not shown) of the engine 1 is connected to the FI/AT-ECU 15, and a signal corresponding to the detected rotational angle of the crankshaft is supplied to the FI/AT-ECU 15. The crank angle position sensor 20 consists of a cylinder discrimination sensor, a TDC sensor, and a CRK sensor. The cylinder discrimination sensor outputs a pulse at a predetermined crank angle position for a specific cylinder of the engine 1 (this pulse will be hereinafter referred to as "CYL pulse"). The TDC sensor outputs a TDC pulse at a crank angle position before a top dead center (TDC) by a predetermined crank angle starting at an intake stroke in each cylinder (at every 180 deg crank angle in the case of a four-cylinder engine). The CRK sensor generates one pulse with a constant crank angle period (e.g., a period of 30 deg) shorter than the period of generation of the TDC pulse (this pulse will be hereinafter referred to as "CRK pulse"). Each CYL pulse, TDC pulse, and CRK pulse is supplied to the FI/AT-ECU 15. These pulses are used to control various timings such as fuel injection timing and ignition timing and for detection of an engine rotational speed NE.

An exhaust pipe 22 of the engine 1 is provided with a three-way catalyst 25 for removing components such as HC, CO, and NOx in exhaust gases. An oxygen concentration sensor 24 is mounted on the exhaust pipe 22 at a position upstream of the three-way catalyst 25. The oxygen concentration sensor 24 outputs a detection signal corresponding to the oxygen concentration in the exhaust gases, and supplies the detection signal to the FI/AT-ECU 15.

A vehicle speed sensor 31 detects a running speed (vehicle speed) VP of the vehicle driven by the engine 1. A vehicle speed signal from the vehicle speed sensor 31 is supplied to the FI/AT-ECU 15. Further, a brake switch 32 detects that a brake pedal (not shown) in the vehicle is depressed. An output signal from the brake switch 32 is supplied to the FI/AT-ECU 15.

The FI/AT-ECU 15 includes an input circuit having various functions. These functions include: 1) a function of shaping the waveforms of input signals from the various sensors; 2) a function of correcting the voltage levels of the input signals to a predetermined level; and 3) a function of converting analog signal values into digital signal values. The FI/AT-ECU further includes a central processing unit (which will be hereinafter referred to as "CPU"), a memory circuit, and an output circuit. The memory circuit preliminarily stores various operational programs to be executed by the CPU and the results of computation or the like obtained by the CPU. The output circuit supplies drive signals to the fuel injection valves 16, the idle control valve 27, etc.

The CPU of the FI/AT-ECU 15 calculates an ignition timing IGLOG, defined as an advance angle from the top dead center, according to engine operating conditions. The CPU also calculates a fuel injection period TOUT as the valve opening period of each fuel injection valve 16, according to engine operating conditions.

The CPU of the FI/AT-ECU 15 further calculates a valve opening control amount ICMD for controlling the valve opening amount of the idle control valve 27, according to engine operating conditions. The amount of air to be supplied through the idle control valve 27 into the engine 1 is substantially proportional to the valve opening control amount ICMD.

The FI/AT-ECU 15 supplies: 1) to each spark plug 21 an ignition signal based on the ignition timing IGLOG; 2) to each fuel injection valve 16 a drive signal based on the fuel injection time TOUT; and 3) to the idle control valve 27 a drive signal based on the valve opening control amount ICMD.

Figure 3:
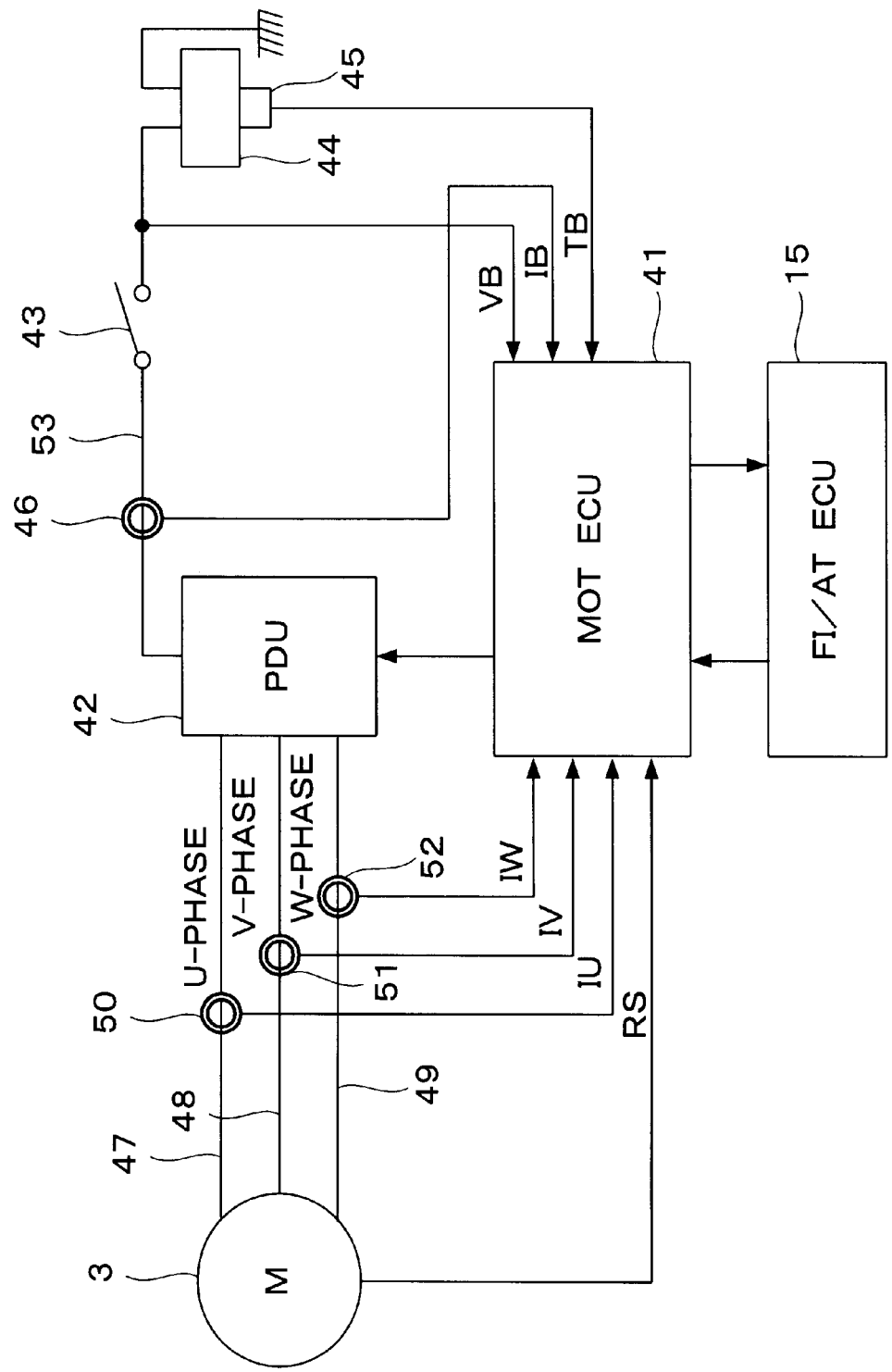
FIG. 3 is a diagram showing a schematic configuration of a control system for a motor shown in FIG. 1.

FIG. 3 shows a schematic configuration of a control system for the motor 3. The motor 3 may be a three-phase AC motor. This motor is connected by lines 47, 48, and 49 to a power drive unit (which will be hereinafter referred to as "PDU") 42. These lines respectively supply three phase currents IU, IV, and IW to the motor 3. The lines 47, 48, and 49 are respectively provided with current sensors 50, 51, and 52 for respectively detecting the currents IU, IV, and IW. Detection signals from these sensors 50, 51, and 52 are supplied to an electronic control unit for motor control (which will be hereinafter referred to as "MOT-ECU") 41.

The motor 3 has a resolver (not shown). The resolver outputs a rotational angle position signal RS indicative of a rotational angle position of a rotor of the motor 3, and supplies the signal RS to the MOT-ECU 41.

The PDU 42 is connected through a line 53 and a main contactor 43 to a high-voltage battery 44. The line 53 is provided with a current sensor 46 for detecting a battery output current IB. A detection signal from the current sensor 46 is supplied to the MOT-ECU 41.

The battery 44 is provided with a temperature sensor 45. The temperature sensor 45 supplies a signal indicative of a battery temperature TB to the MOT-ECU 41. Further, a battery output terminal is connected to the MOT-ECU 41 to detect a battery output voltage VB.

The MOT-ECU 41 is connected to the FI/AT-ECU 15 to transmit and receive necessary information to/from the FI/AT-ECU 15.

The MOT-ECU 41 detects a remaining charge quantity QR of the battery 44 according to the battery output voltage VB, the battery output current IB, and the battery temperature TB. The MOT-ECU 41 controls the PDU 42 according to vehicle operating conditions including: 1) engine operating conditions; 2) the remaining charge quantity QR; 3) the motor currents IU, IV, and IW; and 4) the motor rotational angle position signal RS to perform a drive control and a regeneration control of the motor 3.

The main contactor 43 is maintained in its on-state during operation of the vehicle.

The engine stop control in this preferred embodiment will now be described with reference to FIGS. 4A to 4F.

The engine stop control for automatically stopping the engine 1 upon stoppage of the vehicle is started when a given engine stop condition is satisfied. Specifically, the engine stop condition in this embodiment is satisfied when the engine 1 has been warmed up (the engine coolant temperature TW is greater than or equal to a predetermined temperature TWO), the throttle valve 3 is fully closed, the vehicle speed VP is "0", the remaining charge quantity QR is greater than or equal to a predetermined quantity QR0, and the brake pedal is depressed (the brake switch 32 becomes ON). In FIGS. 4A to 4F, there is shown a case that the engine stop condition is satisfied when the brake switch 32 becomes ON (see FIG. 4B).

When the engine stop condition is satisfied at time t0, the fuel injection for the #4 cylinder, immediately after t0, is stopped, and the next fuel injection for the #2 cylinder is also stopped as shown in FIG. 4D. Thereafter, the fuel injection for the #1 cylinder is performed. When the engine rotational speed NE is less than or equal to a predetermined stop rotational speed NESTP, the subsequent fuel injection is stopped. FIGS. 4A to 4F show the most typical example of the operation, wherein the engine rotational speed NE is normally less than or equal to the predetermined stop rotational speed NESTP at the fuel injection timing for the cylinder (#3 cylinder as shown) following the cylinder (#1 cylinder as shown) for which the fuel injection is carried out. Accordingly, the fuel injection for the #3 cylinder is stopped. Immediately thereafter, the engine 1 is stopped, so that no fuel is supplied to the engine 1 after the time the engine rotational speed NE is less than or equal to the predetermined stop rotational speed NESTP. The predetermined stop rotational speed NESTP is set to a rotational speed (e.g., 150 rpm) where the engine does not rotate by an inertial force.

When carrying out the fuel injection for the #1 cylinder, the fuel injection amount is controlled so that the air-fuel ratio becomes a value (e.g., A/F is about 17) which is suitable for preventing self ignition when an ignition is not performed. The engine 1 is stopped in the condition where the #1 cylinder is on the compression stroke, so that the fuel supplied into the #1 cylinder is used to generate the first explosion upon restarting the engine 1.

Further, as shown in FIG. 4E, the ignition for the cylinder (#1 cylinder) at the timing immediately after the time the engine stop condition is satisfied is carried out, and the ignition for the cylinder (#3 cylinder) at the next ignition timing is carried out. Thereafter, the subsequent ignition is stopped. Accordingly, the fuel supplied before the engine stop condition is satisfied, can be reliably burned, and unwanted ignition after the engine stop condition is satisfied, can be prevented.

Further, as shown in FIG. 4F, the valve opening control amount ICMD of the idle control valve 27 is changed to a predetermined value ICMD2 which is greater than a normal control value ICMD1 after the engine stop condition is satisfied, thereby increasing the intake air amount to the engine 1. This predetermined value ICMD2 is set so that the absolute intake pressure PBA becomes about 41 kPa (310 mmHg), for example. By increasing the intake air amount as mentioned above, the air-fuel ratio of an air-fuel mixture in the cylinder (#1 cylinder), in which the fuel for first explosion upon restarting is left, can be set to a value such that no self ignition occurs. The idle control valve 27 is closed when the engine rotational speed NE becomes the predetermined stop rotational speed NESTP or less.

Thus, according to the above-mentioned engine stop control, the air-fuel mixture for generation of the first explosion upon restarting is retained in the cylinder on the compression stroke during stoppage of the engine.

Although not shown in FIGS. 4A to 4F, the motor 3 is regeneratively operated to increase a load on the engine 1 and stop engine 1 earlier (see FIG. 10H).

The engine restart control in this preferred embodiment will now be described with reference to FIGS. 5A to 5E.

When the brake switch 32 becomes OFF at time t1 (FIG. 5B), an engine restart condition is satisfied. At this time, the motor 3 is rotationally driven to restart the engine 1. As shown in FIG. 5D, the fuel injection (simultaneous injection) for all of the cylinders is carried out at the same time the engine restart condition is satisfied. The fuel injected at this time is introduced to a combustion chamber in each cylinder on the intake stroke.

Further, ignition is permitted at time t1. As shown in FIG. 5E, the ignition for the #1 cylinder on the compression stroke is carried out in response to the generation of a first TDC pulse P1. Since the air-fuel mixture for generation of first explosion is in the #1 cylinder, the first explosion is generated by the first ignition. Thereafter, the ignition for the #3 cylinder is carried out. The fuel injected at time t1 has been introduced to the #3 cylinder, and this fuel is burned by the ignition. Thereafter, the fuel injected at time t1 for the #4, #2, and #1 cylinders is sequentially burned on the respective explosion (combustion) strokes. Subsequently, normal sequential injection is carried out to supply the fuel into each cylinder and sequentially ignite the air-fuel mixture.

FIGS. 6A, 6B, and 6C respectively show changes in: 1) the engine rotational speed NE; 2) the TDC pulse; and 3) the absolute intake pressure PBA, when performing the engine restart control as shown in FIGS. 5A to 5E. FIGS. 6D, 6E, 6F, and 6G respectively show: 1) a driving period of the motor 3; 2) the fuel injection control; 3) the ignition control; and 4) the idle control valve control, in relation to FIGS. 6A to 6C. As shown in FIG. 6D, the motor 3 is driven over a predetermined period (motor driving period) TMOT for cranking.

As shown in FIG. 6E, fixed-amount fuel injections are carried out during a predetermined period TINJ from the start of the engine restart control (from time t1), so as to prevent a rapid increase in the engine rotational speed NE upon engine restarting. The fuel supply amount during the period TINJ is set so that the air-fuel ratio becomes about "20". In other words, the fuel injection amount is controlled to be a smaller amount as compared with the fuel injection amount in normal control where the stoichiometric ratio (14.7) is adopted as a target air-fuel ratio. In this preferred embodiment, the predetermined period TINJ is set to the same peirod (e.g., 750 msec) as the predetermined peirod TMOT.

As shown in FIG. 6F, the ignition timing IGLOG is retarded from the ignition timing in normal control during a predetermined time TRTD (e.g., 500 msec) from time t2 when the engine rotational speed NE has reached a predetermined rotational speed NEL (e.g., 500 rpm).

As shown in FIG. 6G, the idle control valve 27 is maintained in its fully closed condition during the motor driving period TMOT from the start (time t1) of the engine restart control.

According to the above-described control, the output from the engine 1 can be suppressed to prevent a rapid increase in the engine rotational speed NE upon engine restarting.

FIGS. 7A to 7D are flowcharts of the engine stop control mentioned above. FIG. 7A is a flowchart showing a fuel injection control process. FIG. 7B is a flowchart showing a ignition control process. FIG. 7C is a flowchart showing a idle control valve (ICV) control process. And FIG. 7D is a flowchart showing a motor control process. The fuel injection control process, the ignition control process, and the idle control valve control process are executed by the CPU of the FI/AT-ECU 15 in synchronism with the generation of a TDC pulse. The motor control process is executed by the CPU of the MOT-ECU 41.

In step S11, shown in FIG. 7A, it is determined whether or not the present timing of execution of this process corresponds to the first fuel injection timing after the engine stop condition is satisfied. If the answer in step S11 is affirmative (YES), the fuel injection is stopped (step S15). If the answer in step S11 is negative (NO), it is determined whether or not the present timing of execution of this process corresponds to the second fuel injection timing after the engine stop condition is satisfied (step S12). If the answer to step S12 is affirmative (YES), the program proceeds to the step S15 to stop the fuel injection.

If the answer to step S12 is negative (NO), it is determined whether or not the engine rotational speed NE is less than or equal to the predetermined stop rotational speed NESTP (e.g., 150 rpm) (step S13). If NE is greater than NESTP, the fuel injection for engine restarting is carried out (step S14). If NE is less than or equal to NESTP, the program proceeds to the step S15 to stop the fuel injection.

According to the above process, the fuel is supplied to one cylinder on the compression stroke during engine stoppage as shown in FIGS. 4A to 4F.

In step S21 shown in FIG. 7B, it is determined whether or not the present timing of execution of this process corresponds to the first ignition timing after the engine stop condition is satisfied. If the answer to step S21 is affirmative (YES), a normal ignition is carried out (step S24). If the answer to step S21 is negative (NO), it is determined whether or not the present timing of execution of this process corresponds to the second ignition timing after the engine stop condition is satisfied (step S22). If the answer to step S22 is affirmative (YES), the program proceeds to the step S24 to perform the normal ignition.

If the answer to step S22 is negative (NO), the ignition is stopped (step S23).

According to the above process, the ignition of the engine is performed as shown in FIG. 4E.

In step S31 shown in FIG. 7C, the intake air amount of the engine 1 is increased by changing the valve opening control amount ICMD for the idle control valve 27 to the predetermined value ICMD2 greater than the normal control value ICMD1 after the engine stop condition is satisfied. Thereafter, the valve opening control amount ICMD is set to "0" to close the idle control valve 27.

In step S41 shown in FIG. 7D, the motor 3 is regeneratively operated after the engine stop condition is satisfied. According to this process, the load on the engine 1 can be increased by the regenerative operation of the motor 3, to thereby make the engine stoppage earlier.

Figure 8:
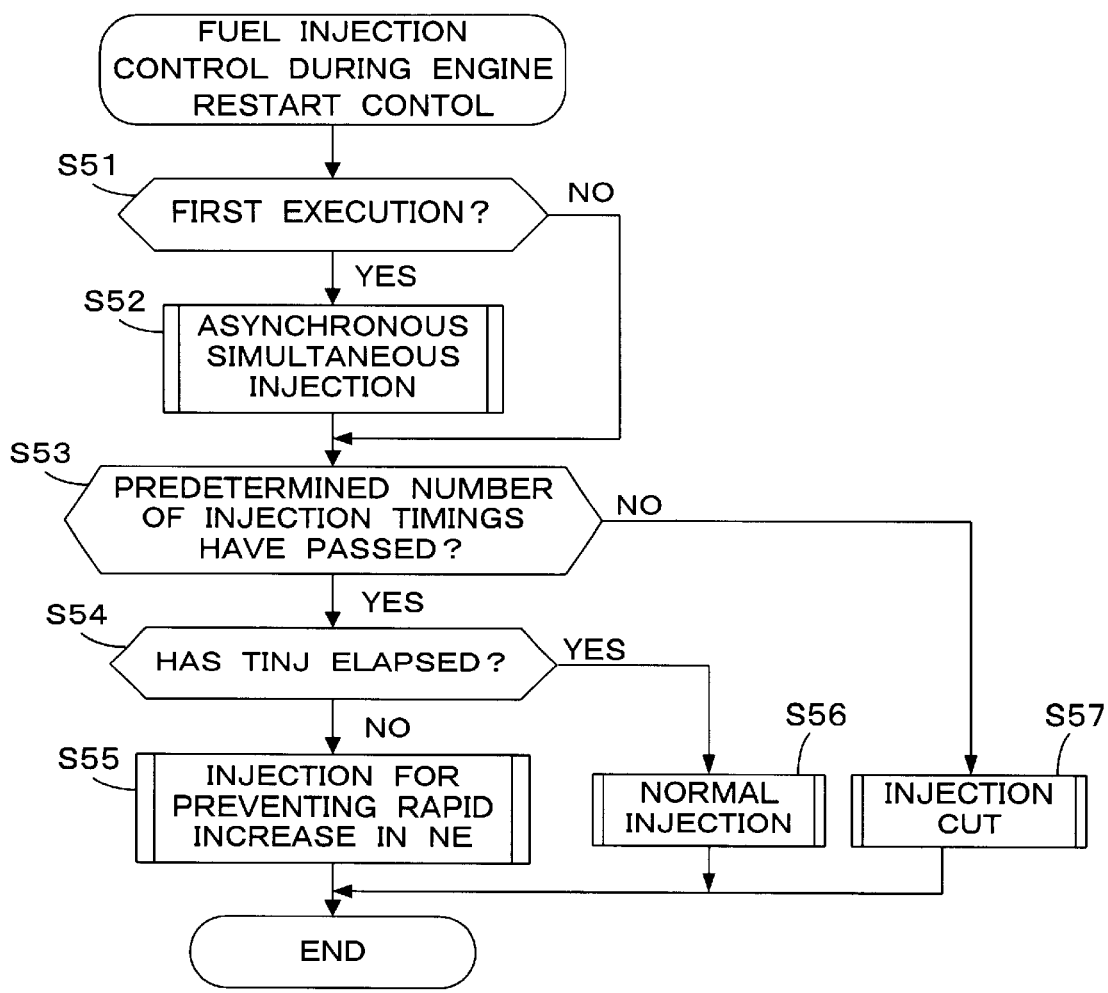
FIG. 8 is a flowchart of a fuel injection control in the engine restart control.
Figure 9C:
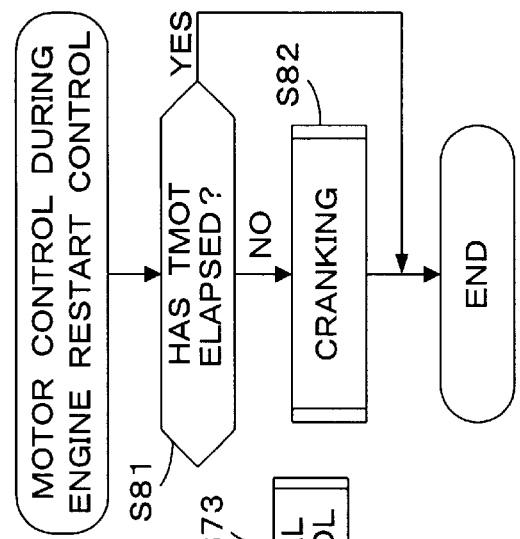
FIGS. 9A, 9B, and 9C are flowcharts of an ignition timing control, an idle control valve control, and a motor control in the engine restart control, respectively.
Figure 9B:
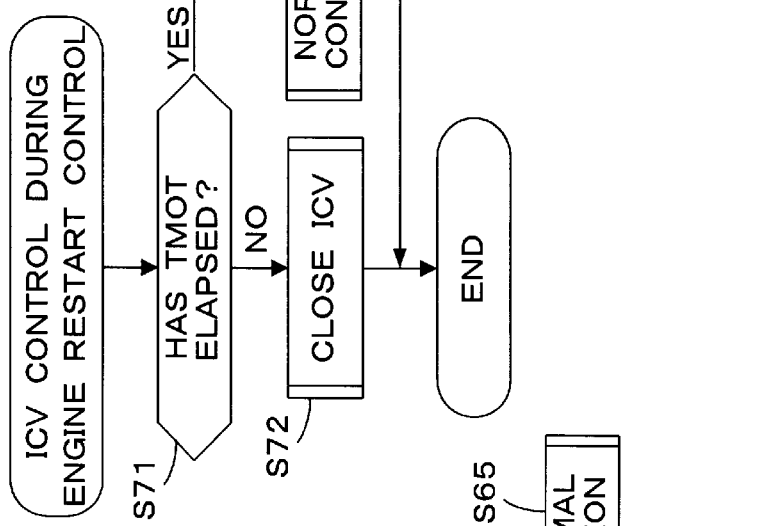
Figure 9A:
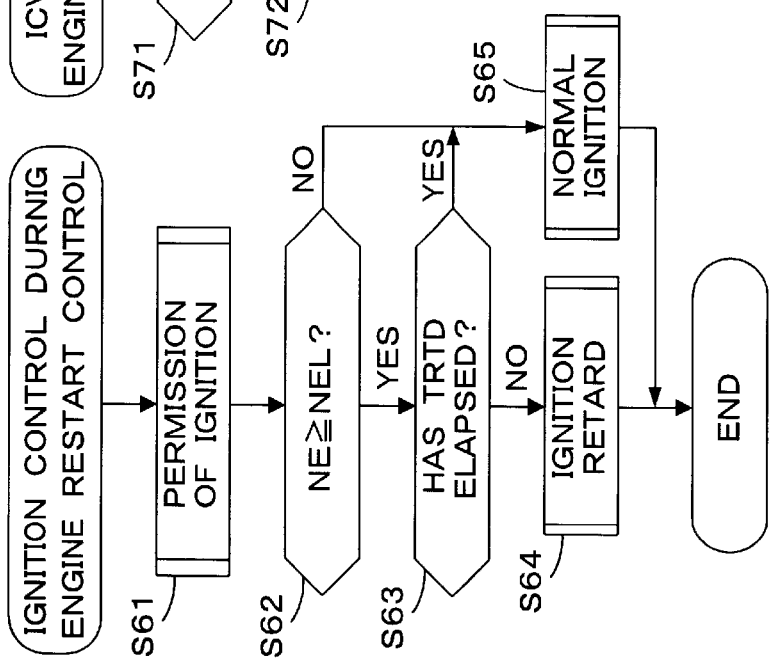

FIGS. 8 and 9A to 9C are flowcharts of the engine restart control mentioned above. FIG. 8 is a flowchart showing a fuel injection control process. FIG. 9A is a flowchart showing an ignition control process. FIG. 9B is a flowchart showing an idle control valve control process. And FIG. 9C is a flowchart showing a motor control process. The fuel injection control process, the ignition control process, and the idle control valve control process in the present embodiment are executed by the CPU of the FI/AT-ECU 15. The motor control process in the present embodiment is executed by the CPU of the MOT-ECU 41.

The fuel injection control process shown in FIG. 8 is executed at the time the engine restart condition is satisfied, and subsequently executed in synchronism with the generation of a TDC pulse.

In step S51, it is determined whether or not the present execution of this process is the first execution. If the answer to step S51 is affirmative (YES), the simultaneous injection for opening all of the fuel injection valves is carried out (step S52). If the answer to step S51 is negative (NO), the program jumps to step S53.

In step S53, it is determined whether or not a predetermined number (i.e., "4" for a 4-cylinder engine) of injection timings have passed. If the answer to step S53 is negative (NO), the fuel injection is stopped (step S57). When the answer to step S53 subsequently becomes affirmative (YES), it is determined whether or not the predetermined period TINJ has elapsed from the time the engine restart condition is satisfied (step S54). If the answer to step S54 is negative (NO), the fuel injection is carried out with a decreased fuel injection amount as compared with a fuel injection amount in the normal fuel injection control (step S55).

If the answer to step S54 is affirmative (YES), the program proceeds to step S56 to perform the normal fuel injection control.

According to the above process, the fuel injection control in engine restarting as shown in FIG. 5D is performed.

The ignition control process shown in FIG. 9A is executed in synchronism with the generation of a TDC pulse.

In step S61, the ignition is permitted. In step S62, it is determined whether or not the engine rotational speed NE is greater than or equal to the predetermined rotational speed NEL. Initially, the answer to step S62 is negative (NO), so that a normal ignition is carried out (step S65). When the answer to step S62 subsequently becomes affirmative (YES), it is determined whether or not the predetermined period TRTD has elapsed from the time the engine restart condition is satisfied (step S63). Initially, the answer to step S63 is negative (NO), so that the program proceeds to step S64, in which an ignition is performed at an ignition timing retarded from the ignition timing in the normal control. When the answer to step S63 subsequently becomes affirmative (YES), the program returns to step S65 to perform the normal control.

According to the above process, the ignition control in engine restarting as shown in FIG. 5E is performed.

The idle control valve control process shown in FIG. 9B is executed in synchronism with the generation of a TDC pulse.

In step S71, it is determined whether or not the predetermined period (motor driving period) TMOT has elapsed from the time the engine restart condition is satisfied. Initially, the answer to step S71 is negative (NO), so that the program proceeds to step S72 to close the idle control valve 27. When the answer to step S71 subsequently becomes affirmative (YES), the normal control is started (step S73).

According to this process, the idle control valve control as shown in FIG. 6G is performed.

In step S81 shown in FIG. 9C, it is determined whether or not the predetermined period TMOT has elapsed from the time the engine restart condition is satisfied. Initially, the answer to step S81 is negative (NO), so that the cranking (motor driving for engine starting) is carried out (step S82). When the answer to step S81 subsequently becomes affirmative (YES), this process ends immediately. According to this process, the motor 3 is driven over the predetermined period TMOT from the time the engine restart condition is satisfied.

FIGS. 10A to 10H are time charts for illustrating the engine stop control and the engine restart control. FIG. 10A shows changes of an idle stop flag FIDLSTP which is set to "1" during a time period from the time the engine stop condition is satisfied to the time the engine restart condition is satisfied. FIG. 10B shows TDC pulses. FIGS. 10C, 10D, 10E, 10F, 10G, and 10H respectively show changes: 1) in the engine rotational speed NE; 2) in the absolute intake pressure PBA; 3) in the fuel injection period TOUT; 4) in the ignition timing IGLOG; 5) in the intake air amount QAIR; and 6) in the torque TRQM generated by the motor 3.

When the engine stop condition is satisfied at time t0, the engine stop control mentioned above is performed to stop the engine in about 0.6 sec. Since the motor 3 is regeneratively operated, the torque TRQM generated by the motor 3 takes negative values.

When the engine restart condition is satisfied at time t1, the cranking by the motor 3 is started to gradually increase the engine rotational speed NE and gradually decrease the absolute intake pressure PBA. The fuel injection period TOUT is maintained at a substantially constant value during the predetermined period TINJ from time t1 to time t4, so that the air-fuel ratio becomes about "20". The ignition timing IGLOG is retarded during a time period from time t2 to time t3. The idle control valve 27 is maintained in its fully closed condition until time t4. The motor output torque TRQM is set to "0" after time t4.

Figure 11:
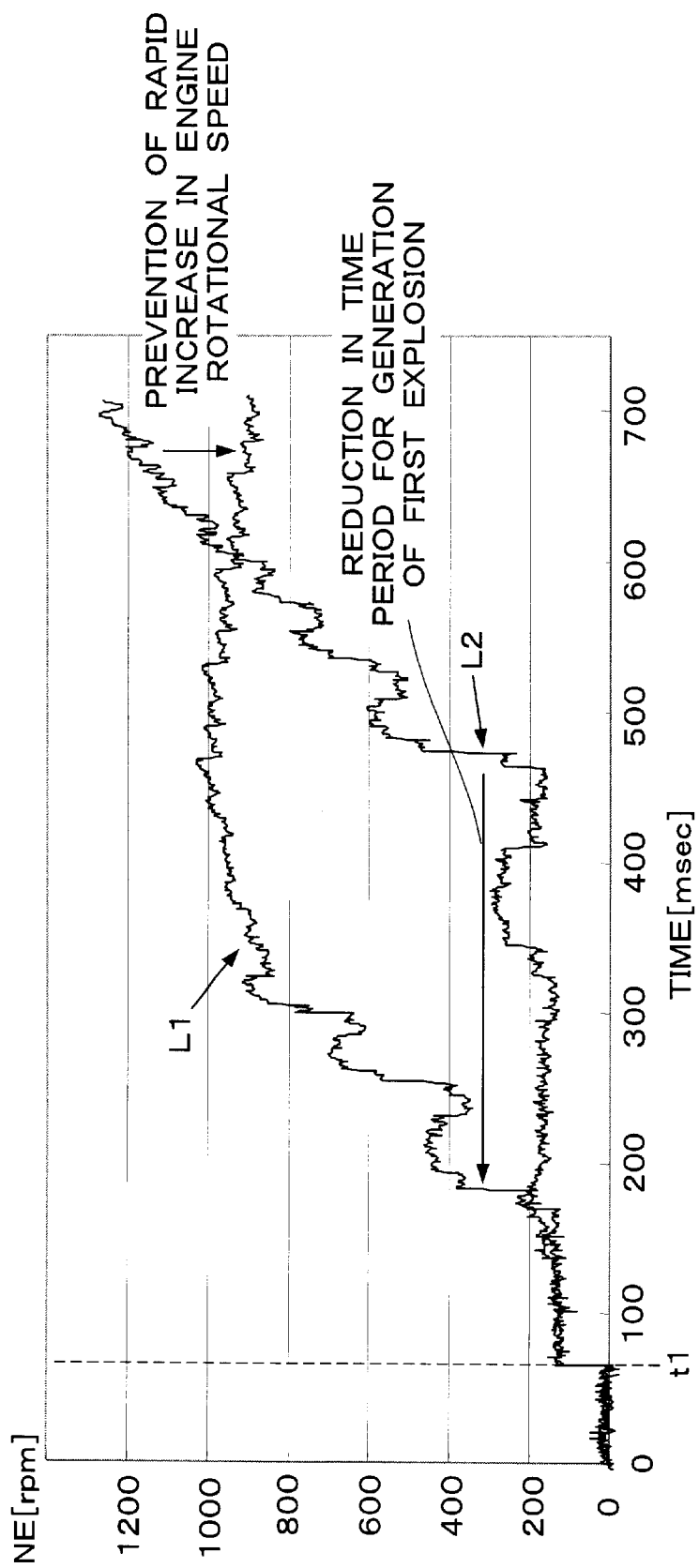
FIG. 11 is a time chart showing changes in the engine rotational speed when restarting the engine.
Figure 12:
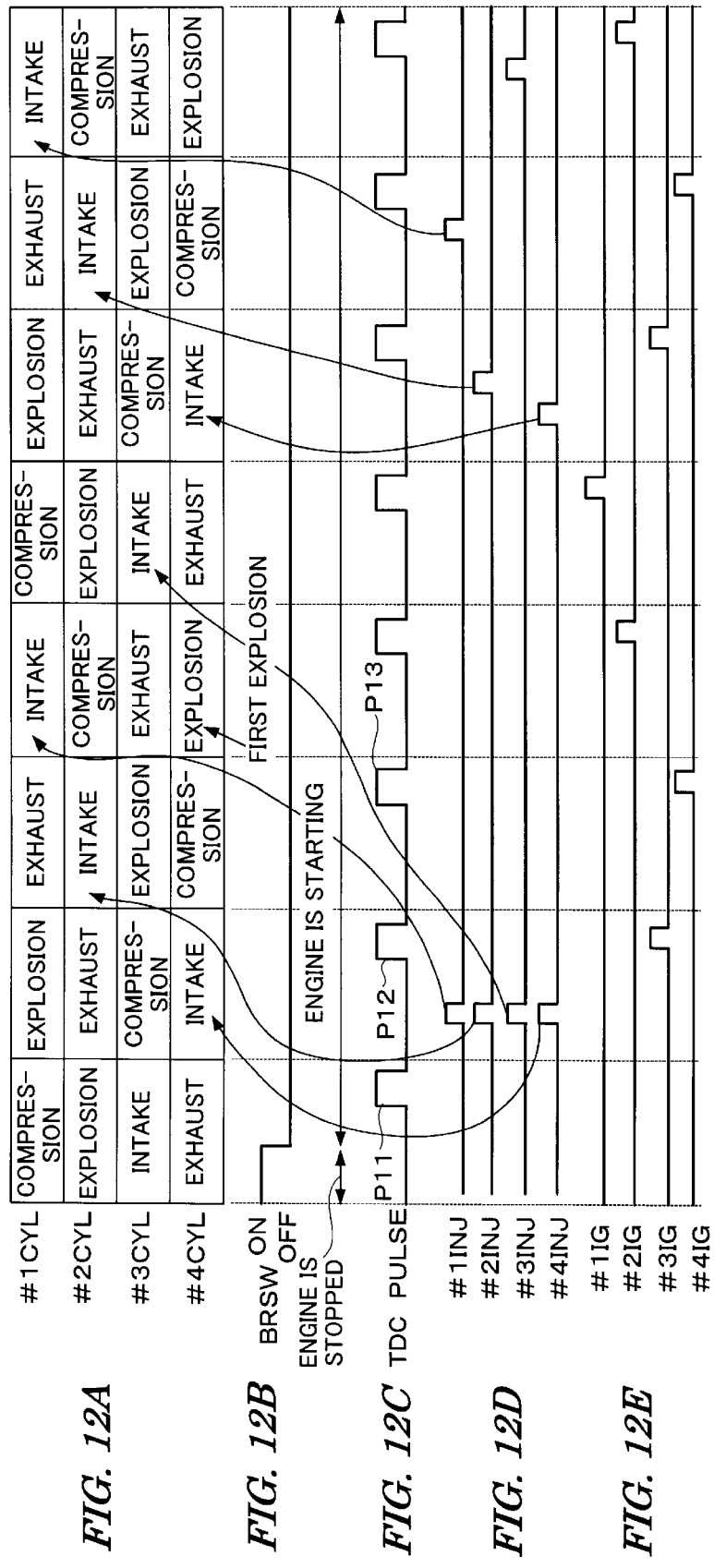
FIGS. 12A to 12E are time charts for illustrating the engine restart control in the prior art.
Figure 13:
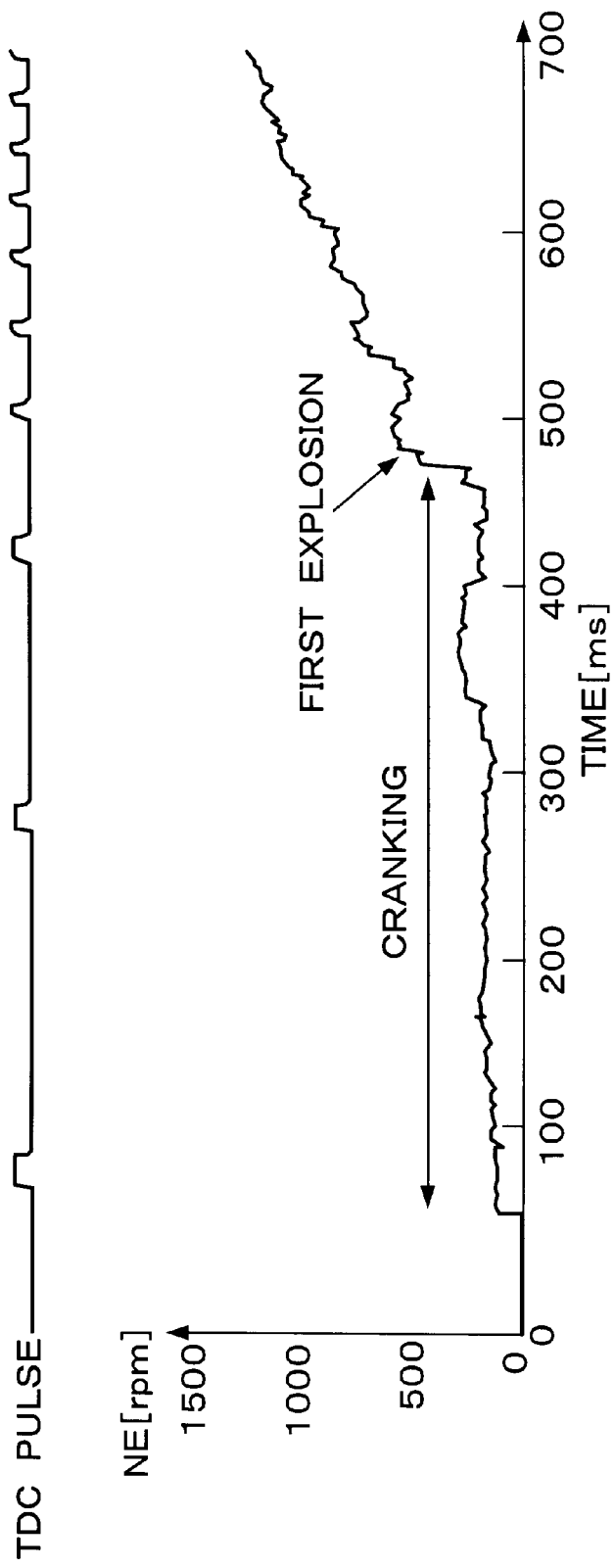
FIG. 13 is a time chart showing changes in the engine rotational speed when performing engine restart by applying the conventional control.

FIG. 11 is a time chart showing changes in the engine rotational speed NE when restarting the engine. In FIG. 11, the changes in the engine rotational speed NE of the present embodiment is shown with those of the prior art. That is, the line L1 corresponds to the present embodiment, and the line L2 corresponds to the prior art. As apparent from FIG. 11, the first explosion is generated about 290 msec earlier according to this preferred embodiment as compared with the prior art. Furthermore, an advantage of preventing a rapid increase in the engine rotational speed NE when restarting the engine is obtained.

In this preferred embodiment, the FI/AT-ECU 15 constitutes the fuel supply stop control means, the fuel supply start control means, the ignition control means, the fuel amount control means, the retard control means, the air-fuel ratio adjusting means, and the inhibiting means. Further, the MOT-ECU 41 constitutes the regeneration control means.

Specifically, the process shown in FIG. 7A corresponds to the fuel supply stop control means. The process shown in FIG. 8 corresponds to the fuel supply start control means. The process shown in FIG. 7B corresponds to the ignition control means. And the process shown in FIG. 7D corresponds to the regeneration control means. Step S14 in FIG. 7A corresponds to the fuel amount control means. Steps S62, S63, and S64 in FIG. 9A correspond to the retard control means. The process shown in FIG. 7C corresponds to the air-fuel ratio adjusting means. Steps S71 and S72 in FIG. 9B correspond to the inhibiting means. Further, the bypass passage 26 and the idle control valve 27 correspond to the intake air amount increasing means.

The present invention is not limited to the above preferred embodiment, but various modifications may be made. For example, in the engine stop control during the time period from the time the engine stop condition is satisfied to the time the engine rotational speed NE is less than or equal to the predetermined rotational speed NESTP, the fuel supply may be continued with such a fuel amount that makes an air-fuel ratio so lean that no self ignition occurs. In this case, the ignition control is performed in the same way as the above-described embodiment. That is, the first ignition and the second ignition after the engine stop condition is satisfied are carried out, and the subsequent ignition is not carried out. Also by such control, the fuel for the first explosion can be retained in the cylinder on the compression stroke during engine stoppage. However, since the emission of unburnt fuel has an adverse effect on the exhaust characteristics of the engine, it is preferable to stop the fuel supply as, fast as possible and retain the fuel for the first explosion in only one necessary cylinder as in the above preferred embodiment.

Further, in the above preferred embodiment, the simultaneous injection for the four cylinders is carried out at the time the engine restart condition is satisfied, and the fuel injection at the subsequent four fuel injection timings is not carried out. As a modification, the fuel injection for the cylinder (e.g., #3 cylinder shown in FIGS. 5A to 5E) on the intake stroke during engine stoppage may be carried out at the time the engine restart condition is satisfied, and the sequential injection may be subsequently carried out. As another modification, a simultaneous injection for two or three cylinders including the cylinder on the intake stroke during engine stoppage may be carried out, and the fuel injection at the subsequent two or three injection timings may not be carried out. Thereafter, the sequential injection may be carried out.

Further, in the above preferred embodiment, the reduction in fuel amount, the retard of ignition timing, and the closing of the idle control valve are cooperatively carried out to prevent a rapid increase in engine rotational speed. Alternatively, any one or two of these operations (the fuel amount reduction, the ignition timing retard, and the idle control valve closing) may be carried out.

The intake air amount increasing means may be realized by driving the throttle valve 13 with an actuator instead of using the bypass passage 26 and the idle control valve 27.

Further, while the present invention is applied to a hybrid vehicle in the above preferred embodiment, the present invention may be applied to a normal vehicle having an internal combustion engine and an engine starter motor.

Further, while the present invention is applied to a four-cylinder internal combustion engine in the above preferred embodiment, the present invention may be applied to any multiple-cylinder internal combustion engine, e.g. a six-cylinder engine or an eight-cylinder engine. In these examples, the number (the first predetermined number) of cylinders to which the fuel supply is stopped after the engine stop condition is satisfied, and the number (the second predetermined number) of cylinders in which the normal ignition is carried out after the engine stop condition is satisfied, are modified in the following manner. In the case of a six-cylinder engine, the first predetermined number becomes "2" and the second predetermined number becomes "3". In the case of an eight-cylinder engine, the first predetermined number becomes "2" and the second predetermined number becomes "4".

Further, the first predetermined period TINJ is set equal to the third predetermined period TMOT in the above preferred embodiment. These periods may be set to different values.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. An automatic stop and start control system for a multiple-cylinder internal combustion engine mounted on a vehicle, said control system controls automatically stopping and restarting said engine according to operating conditions of said vehicle and said engine, said automatic stop and start control system comprising:

fuel supply stop control means for providing a fuel supply to at least one of the cylinders of said engine, when an engine stop condition for stopping said engine is satisfied, and subsequently stopping the fuel supply to all of the cylinders of said engine; and fuel supply start control means for immediately providing the fuel supply to at least one of said cylinders at the time an engine restart condition for restarting said engine is satisfied.

2. An automatic stop and start control system according to claim 1, wherein when the engine stop condition is satisfied, said fuel supply stop control means first stops the fuel supply to a first predetermined number of cylinders and then provides the fuel supply to said at least one cylinder.

3. An automatic stop and start control system according to claim 1, further comprising ignition control means for first carrying out ignitions of a second predetermined number of cylinders, when the engine stop condition is satisfied, and then stopping the subsequent ignition.

4. An automatic stop and start control system according to claim 1, wherein:

said vehicle has a motor capable of rotationally driving an output shaft of said engine and performing a regenerative operation for converting rotational energy of said output shaft into electrical energy;

said control system further comprising regeneration control means for performing the regenerative operation of said motor when the engine stop condition is satisfied.

5. An automatic stop and start control system according to claim 1, wherein said fuel supply start control means comprises fuel amount control means for decreasing a fuel amount to be supplied to said engine as compared with the fuel amount in normal control, during a first predetermined time period from the time the engine restart condition is satisfied.

6. An automatic stop and start control system according to claim 1, further comprising retard control means for retarding an ignition timing of said engine from the ignition timing in normal control, during a second predetermined time period from the time a rotational speed of said engine equals or exceeds a predetermined rotational speed when restarting said engine.

7. An automatic stop and start control system according to claim 1, wherein:

said engine is provided with intake air amount increasing means for increasing an intake air amount to said engine;

said control system further comprising air-fuel ratio adjusting means for increasing the intake air amount by operating said intake air amount increasing means after the engine stop condition is satisfied.

8. An automatic stop and start control system according to claim 7, further comprising inhibiting means for inhibiting the operation of said intake air amount increasing means during a third predetermined time period from the time the engine restart condition is satisfied.

9. An automatic stop and start control method for a multiple-cylinder internal combustion engine mounted on a vehicle, said method controls automatically stopping and restarting said engine according to operating conditions of said vehicle and said engine, said automatic stop and start control method comprising:

a) providing a fuel supply to at least one of the cylinders of said engine, when an engine stop condition for stopping said engine is satisfied, b) stopping the fuel supply to all the cylinders of said engine; and c) providing the fuel supply to at least one of said cylinders immediately at the time an engine restart condition for restarting said engine is satisfied.

10. An automatic stop and start control method according to claim 9, wherein when the engine stop condition is satisfied, the fuel supply to a first predetermined number of cylinders is stopped first, and then the fuel supply to said at least one cylinder is provided.

11. An automatic stop and start control method according to claim 9, further comprising the steps of:

d) carrying out ignitions of a second predetermined number of cylinders, when the engine stop condition is satisfied, and e) stopping the subsequent ignition.

12. An automatic stop and start control method according to claim 9, wherein:

said vehicle has a motor capable of rotationally driving an output shaft of said engine and performing a regenerative operation for converting rotational energy of said output shaft into electrical energy, and said method further comprising performing the regenerative operation of said motor when the engine stop condition is satisfied.

13. An automatic stop and start control method according to claim 9, further comprising decreasing a fuel amount to be supplied to said engine as compared with the fuel amount in normal control, during a first predetermined time period from the time the engine restart condition is satisfied.

14. An automatic stop and start control method according to claim 9, further comprising retarding an ignition timing of said engine from the ignition timing in normal control, during a second predetermined time period from the time a rotational speed of said engine equals or exceeds a predetermined rotational speed when restarting said engine.

15. An automatic stop and start control method according to claim 9, wherein:

said engine is provided with intake air amount increasing means for increasing an intake air amount to said engine, and said method further comprises increasing the intake air amount after the engine stop condition is satisfied.

16. An automatic stop and start control method according to claim 15, further comprising inhibiting the increment of the intake air amount during a third predetermined time period from the time the engine restart condition is satisfied.

17. An automatic stop and start control system for a multiple-cylinder internal combustion engine mounted on a vehicle, said system controls automatically stopping and restarting said engine according to operating conditions of said vehicle and said engine, said automatic stop and start control system comprising:

a fuel supply stop control module for providing a fuel supply to at least one of the cylinders of said engine, when an engine stop condition for stopping said engine is satisfied, and subsequently stopping the fuel supply to all the cylinders of said engine; and a fuel supply start control module for immediately providing the fuel supply to at least one of said cylinders at the time an engine restart condition for restarting said engine is satisfied.

18. An automatic stop and start control system according to claim 17, wherein when the engine stop condition is satisfied, said fuel supply stop control module first stops the fuel supply to a first predetermined number of cylinders and then provides the fuel supply to said at least one cylinder.

19. An automatic stop and start control system according to claim 17, further comprising an ignition control module for first carrying out ignitions of a second predetermined number of cylinders, when the engine stop condition is satisfied, and next stopping the subsequent ignition.

20. An automatic stop and start control system according to claim 17, wherein:

said vehicle has a motor capable of rotationally driving an output shaft of said engine and performing a regenerative operation for converting rotational energy of said output shaft into electrical energy;

said control system further comprising a regeneration control module for performing the regenerative operation of said motor when the engine stop condition is satisfied.

21. An automatic stop and start control system according to claim 17, wherein said fuel supply start control module comprises fuel amount control module for decreasing a fuel amount to be supplied to said engine as compared with the fuel amount in normal control, during a first predetermined time period from the time the engine restart condition is satisfied.

22. An automatic stop and start control system according to claim 17, further comprising a retard control module for retarding an ignition timing of said engine from the ignition timing in normal control, during a second predetermined time period from the time a rotational speed of said engine equals or exceeds a predetermined rotational speed when restarting said engine.

23. An automatic stop and start control system according to claim 17, wherein:

said engine is provided with an intake air amount increasing module for increasing an intake air amount to said engine;

said control system further comprising an air-fuel ratio adjusting module for increasing the intake air amount by operating said intake air amount increasing module after the engine stop condition is satisfied.

24. An automatic stop and start control system according to claim 23, further comprising an inhibiting module for inhibiting the operation of said intake air amount increasing module during a third predetermined time period from the time the engine restart condition is satisfied.

* * * * *